(12) United States Patent
Xie et al.

(10) Patent No.: US 10,228,476 B2
(45) Date of Patent: Mar. 12, 2019

(54) METHOD FOR SURVEY DATA PROCESSING COMPENSATING FOR VISCO-ACOUSTIC EFFECTS IN TILTED TRANSVERSE ISOTROPY REVERSE TIME MIGRATION

(71) Applicant: CGG SERVICES SA, Massy (FR)

(72) Inventors: Yi Xie, Singapore (SG); James Sun, Crawley (GB); Joe Zhou, Singapore (SG)

(73) Assignee: CGG SERVICES SAS, Massy (FR)

(*) Notice: Subject to any disclaimer, the term of this patent is extended or adjusted under 35 U.S.C. 154(b) by 223 days.

(21) Appl. No.: 15/086,587

(22) Filed: Mar. 31, 2016

(65) Prior Publication Data

US 2016/0291178 A1 Oct. 6, 2016

Related U.S. Application Data

(60) Provisional application No. 62/140,728, filed on Mar. 31, 2015.

(51) Int. Cl.
| | |
|---|---|
| *G01V 1/28* | (2006.01) |
| *G01V 1/30* | (2006.01) |
| *G01V 1/36* | (2006.01) |
| *G01V 1/38* | (2006.01) |

(52) U.S. Cl.
CPC .............. *G01V 1/282* (2013.01); *G01V 1/28* (2013.01); *G01V 1/306* (2013.01); *G01V 1/362* (2013.01); *G01V 1/38* (2013.01); *G01V 2210/512* (2013.01); *G01V 2210/626* (2013.01); *G01V 2210/679* (2013.01)

(58) Field of Classification Search
None
See application file for complete search history.

(56) References Cited

U.S. PATENT DOCUMENTS

| | | | | |
|---|---|---|---|---|
| 2013/0107665 A1* | 5/2013 | Fletcher | .................. | G01V 1/36 367/43 |
| 2015/0185346 A1* | 7/2015 | Nemeth | .................. | G01V 1/36 702/18 |

OTHER PUBLICATIONS

M. Guo, et al.; "We P09 01 The Application of GPU-based TTI RTM in a Complex Area with Shallow Gas and Fault Shadow—A Case History"; 75th EAGE Conference & Exhibition incorporating SPE EUROPEC 2013; XP055271627; Jun. 10, 2013; pp. 1-5.

S. Suh, et al.; "Compensating Visco-acoustic effects in anisotropic reverse-time migration"; SEG Las Vegas 2012 Annual Meeting; SEG Technical Program Expanded Abstracts; XP055271628; Sep. 1, 2012; pp. 1-5.

E. Causse, et al.; "Finite-Difference Inversion in Viscoacoustic Media"; EAGE 58th Conference and Technical Exhibition; XP055271621; Jun. 6, 1996.

(Continued)

*Primary Examiner* — Reema Patel
*Assistant Examiner* — Steven M Christopher
(74) *Attorney, Agent, or Firm* — Patent Portfolio Builders PLLC (57) ABSTRACT

A method for survey data processing compensates for visco-acoustic effects in TTI medium in an RTM method. This method employs propagating in conjugate medium to yield correct phase, and acoustic wave propagation to yield correct amplitudes through adaptive matching filtering.

15 Claims, 9 Drawing Sheets

(56) References Cited

OTHER PUBLICATIONS

Y. Chen, et al.; "Use Q-RTM to Image Beneath Gas Hydrates in Alaminos Canyon, Gulf of Mexico"; SEG Denver 2010 Annual Meeting; SEG Technical Program Expanded Abstracts; XP055271623; Sep. 1, 2010; pp. 3165-3170.
Extended European Search Report in corresponding European Application No. EP 16 30 5370 dated May 25, 2016. (Reference by Kefeng Xin, et al., "3-D tmographic amplitude inversion for compensating amplitude attenuation in the overburden" was submitted in an Information Disclosure Statement dated Mar. 31, 2016.).
Bickel et al., "Plane-wave Q Deconvolution," Geophysics, Sep. 1985, pp. 1426-1439, vol. 50, No. 9.
Carcione et al., "Viscoacoustic wave propagation simulation in the earth," Geophysics, Jun. 1988, pp. 769-777, vol. 53, No. 6.
Dai et al., "Inverse Q migration," 64th SEG Annual International Meeting, Expanded Abstracts, Oct. 23-28, 1994, pp. 1418-1421, Los Angeles, CA.
Day et al., "Numerical simulation of attenuated wavefields using a Pade approximant method," Geophysical Journal of the Royal Astronomical Society, Jul. 1984, pp. 105-118, vol. 78, No. 1.
Hargreaves et al., "Inverse Q filtering by Fourier transform," Geophysics, Apr. 1991, pp. 519-527, vol. 56, No. 4.
Kjartansson, "Constant Q-Wave Propagation and Attenuation," Journal of Geophysical Research, Aug. 10, 1979, vol. 84, No. B9.
Liu et al., "Velocity dispersion due to anelasticity; implications for seismology and mantle composition," Geophysical Journal of the Royal Astronomical Society, Oct. 1976, pp. 41-58, vol. 47, No. 1.
Robertsson et al., "Viscoelastic finite-difference modeling," Geophysics, Sep. 1994, pp. 1444-1454, vol. 59, No. 9.
Xie et al., "3D prestack beam migration with compensation for frequency dependent absorption and dispersion," 72nd EAGE Conference & Exhibition incorporating SPE EUROPEC 2010, Jun. 14-17, 2010, Barcelona, Spain.
Xie et al., "3D prestack depth migration with compensation for frequency dependent absorption and dispersion," SEG Technical Program Expanded Abstracts 2009, SEG Houston 2009 International Exposition and Annual Meeting, Oct. 25-30, 2009, pp. 2919-2922, Houston, TX.
Xin et al., "3-D tomographic amplitude inversion for compensating amplitude attenuation in the overburden," SEG Las Vegas 2008 Annual Meeting, Nov. 9-14, 2008, pp. 3239-3243, 2008, Las Vegas, NV.
Xin et al., "3-D tomographic Q inversion for compensating frequency dependent attenuation and dispersion," SEG Technical Program Expanded Abstracts 2009, SEG Houston 2009 International Exposition and Annual Meeting, Oct. 25-30, 2009, pp. 4014-4018, Houston, TX.
Yu et al., "Compensation for the effects of shallow gas attenuation with viscoacoustic wave-equation migration," SEG Int'l Exposition and 72nd Annual Meeting, Oct. 6-11, 2002, Salt Lake City, UT.
Zhang et al., "Compensating for visco-acoustic effects in reverse-time migration," SEG Technical Program Expanded Abstracts 2010, SEG Denver 2010 Annual Meeting, Oct. 17-22, 2010, pp. 3160-3164, Denver, CO.
Zhang et al., "Practical issues of reverse time migration: true amplitude gathers, noise removal and harmonic-source encoding," CPS/SEG Beijing 2009 International Geophysical Conference & Exposition, Apr. 24-27, 2009, Beijing, CN.
Zhou et al., "Tomographic Residual Curvature Analysis: The Process and its Components," 73rd SEG Annual International Meeting, Expanded Abstracts, 2003, pp. 666-669.
Aki et al., "Quantitative Seismology: Theory and Methods vol. I," 1980, W.H. Freeman and Company, New York, US.
Ruppel et al., "Scientific results from Gulf of Mexico Gas hydrates Joint Industry Project Leg 1 drilling: Introduction and overview," Marine and Petroleum Geology, Nov. 2008, pp. 819-829, vol. 25, No. 9.
Office Action in related European Application No. 16305370.5 dated Aug. 24, 2018.
Office Action in Singapore Application No. 10201602562Q dated May 17, 2018. (All references not cited herewith have been previously made of record.).

* cited by examiner

METHOD FOR SURVEY DATA PROCESSING COMPENSATING FOR VISCO-ACOUSTIC EFFECTS IN TILTED TRANSVERSE ISOTROPY REVERSE TIME MIGRATION

CROSS REFERENCE TO RELATED APPLICATIONS

This application claims priority and benefit from U.S. Provisional Patent Application No. 62/140,728 filed on Mar. 31, 2015, for "Compensate for visco-acoustic effects in TTI reverse time migration," the content of which is incorporated in its entirety herein by reference.

BACKGROUND

Technical Field

Embodiments of the subject matter disclosed herein generally relate to seismic data processing, more particularly, to obtaining an enhanced image of structures under complex geological regions with strong velocity contrast and substantial attenuation, by compensating for visco-acoustic effects in a tilted transverse isotropy (TTI) medium while applying a reverse time migration (RTM) method.

Discussion of the Background

In spite of the momentary over-supply of fossil fuel, interest in developing new oil and gas production fields remains strong for both land and offshore locations. Drilling is an expensive process. Therefore, before engaging in such a costly undertaking, geophysical surveys are performed to achieve more accurate information about underground formations (the term "underground" includes under the seafloor). Data acquired during geological surveys is processed to generate a profile (image) of the underground formations. While this profile does not provide an accurate location of oil and gas, it suggests, to those trained in the field, the presence or absence of oil and/or gas.

Figure 1:
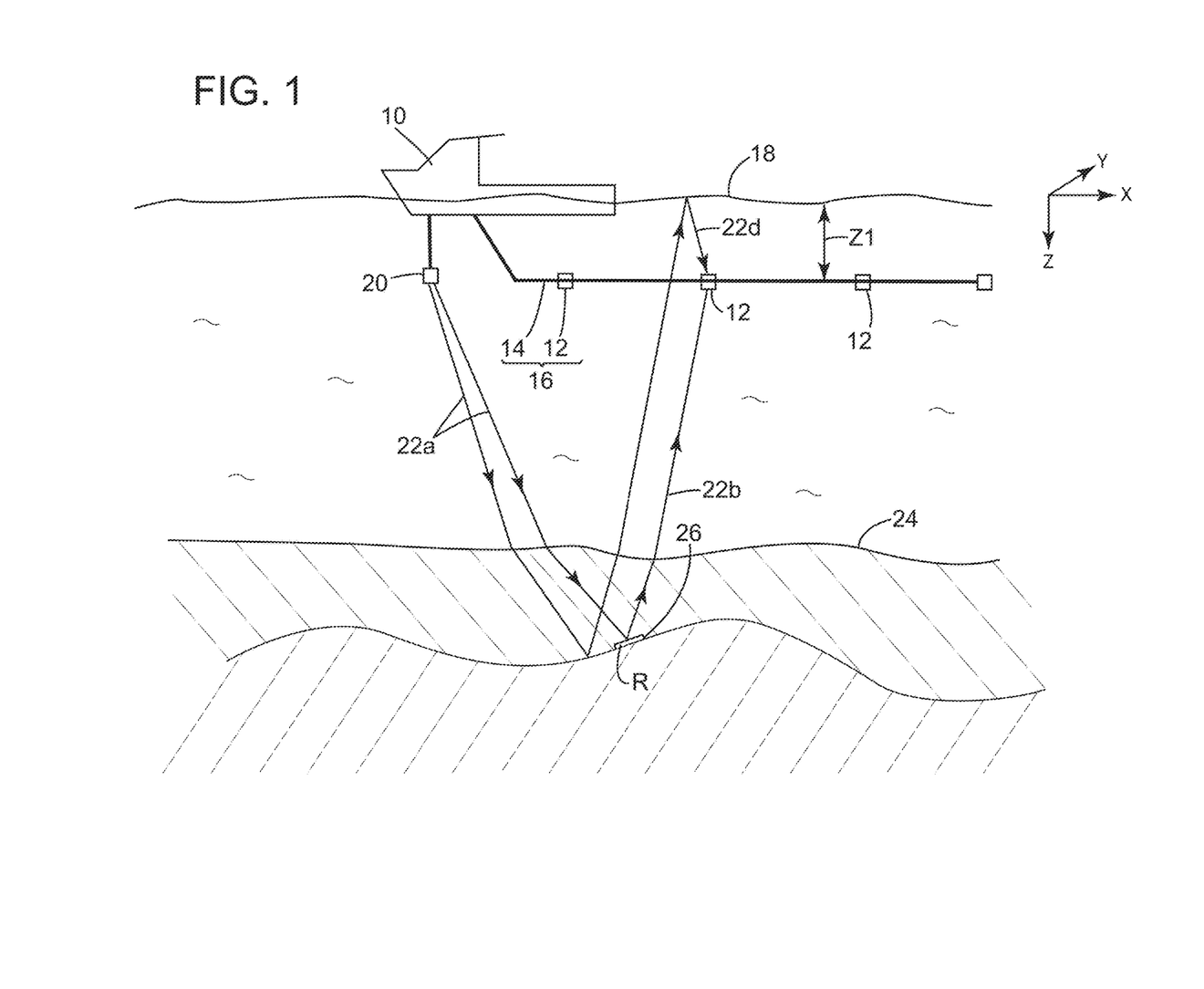
FIG. 1 illustrates seismic data acquisition.

FIG. 1 illustrates a marine seismic survey during which seismic data is collected to explore a geological structure under the seafloor. Vessel 10 tows an array of seismic receivers 12 provided on cables 14 that form streamers 16 (only one is visible in this vertical view, but plural streamers may be arranged in a horizontal xy plane), at a depth $z_1$ below water surface 18. The streamers may be towed horizontally (at substantially constant depth $z_1$ throughout their length during the survey as illustrated), arranged in a slanted or curved configuration (i.e., depth varying along the streamer), or at different depths. Vessel 10 may also tow a wave source 20 configured to generate waves 22a. Waves 22a propagate down toward the seafloor 24 penetrate it and are then partially reflected and/or refracted at interfaces between layers where the wave propagation velocity changes. Reflected acoustic waves such as 22b and 22c (redirected upward by reflector 26) may be detected by receivers 12 directly as emerging from the seafloor and/or as ghost reflections from the water surface, such as 22d. Data (wave amplitude versus time series) recorded by the receivers is processed to extract information about the underground formations. Processing may include various phases, e.g., velocity model determination, pre-stack migration, post-stack processing, etc., which are known in the art.

It has been observed (as discussed in the book, *Quantitative Seismology*, by Aki and Richards, published 1980 by W.H. Freeman & Co, relevant portions of which are incorporated by reference) that the anelastic effects (e.g., anelastic attenuation, which is characterized by seismic quality factor Q that is inversely proportional to attenuation) cause seismic energy to decrease along the path and wavelet distortion. For example, gas trapped in overburden (i.e., above structures of interest such as an oil reservoir) can strongly attenuate seismic P-waves. As a result, not only is the migrated amplitude dim below the gas, but the imaging resolution is also greatly reduced due to high-frequency energy loss and phase distortion.

Some conventional methods (as described, e.g., in Kjartansson,'s 1979 article, "Constant Q-wave propagation and attenuation," in the *Journal of Geophysical Research* 84, B9, pages 4,737-4,748; Bickel et al.'s 1985 article, "Plane-wave Q deconvolution," published in *Geophysics* 50, pages 1,426-1,439; and/or Calvert et al.'s 1991 article, "Inverse Q-filtering by Fourier transform," in *Geophysics* 56, pages 519-527, the contents of which are incorporated herein in their entirety) compensate for the seismic absorption in the data domain using an inverse Q-filter. These methods are based on one-dimensional backward propagation and cannot correctly handle real geological complexity. Some methods correct for anelastic attenuation and dispersion in a pre-stack depth migration (a logical choice since these phenomena occur during wave propagation). However, most migration methods usually treat the underground formation's model as a lossless acoustic medium, attempting to correct only for the amplitude effect due to geometric spreading (see, e.g., relevant portions of the book, *Mathematics of multidimensional seismic inversion*, by Bleistein et al., Springer Publishing Company, 2001). Two main reasons account for this situation. First, it is difficult to accurately estimate the Q factor from seismic data. Second, the technology of migrating seismic data using a visco-acoustic equation or an anelastic equation has not been well-established.

In a generalized method for estimating absorption losses (e.g., as described in Xin et al.'s 2008 article, "3D tomographic amplitude inversion for compensating amplitude attenuation in the overburden," in 78th SEG Annual International Meeting, Expanded Abstracts, pages 3,239-3,243, the content of which is incorporated herein in its entirety), the analysis is performed on the migrated data and based on a tomographic velocity updating algorithm (e.g., as described by Zhou et al.'s 2003 article, "Tomographic residual curvature analysis: The process and its components," in 73 SEG Annual International Meeting, Expanded Abstracts, pages 666-669, the content of which is incorporated herein in its entirety). Efficient approaches for compensation of frequency-dependent dissipation effects in Kirchhoff and Gaussian beam pre-stack depth migration making use of the absorption model estimated from a 3D tomographic amplitude inversion apply Q compensation during migration, fully honor actual raypaths (see, e.g., Xie et al.'s 2009 article, "3D prestack depth migration with compensation for frequency-dependent absorption and dispersion," in 79th SEG Annual International Meeting, Expanded Abstracts, pages 2,919-2,922; and Xie et al.'s 2010 article, "3D prestack beam migration with compensation for frequency dependent absorption and dispersion," presented at the 72nd EAGE Annual International Conference and Exhibition, the contents of which are incorporated herein in their entirety).

Some effort has been made to develop an inverse Q-migration using one-way wave equation migration (see, e.g., Dai et al. 1994's article, "Inverse Q-migration," in 64th SEG Annual International Meeting, Expanded Abstracts, pages 1,418-1,421; and Yu et al.'s 2002 article, "Compensation for the effects of shallow gas attenuation with visco-acoustic wave-equation migration," in 72nd SEG Annual International Meeting, Expanded Abstracts, pages 2,062-2,065, the contents of which are incorporated herein in their entirety). The one-way wave equation is in this case formulated in the frequency domain to directly account for frequency-dependent dissipation. RTM based on directly solving the two-way wave equation provides a superior way to image complex geologic regions and has become a standard migration tool for subsalt imaging, especially in the Gulf of Mexico. A time domain wave equation to model the visco-acoustic effects is needed to incorporate an attenuation correction in RTM. A pseudo-differential equation to model isotropic visco-acoustic waves based on the dispersion relation has been applied in reverse time migration to compensate for the anelastic effects in seismic images (see, e.g., Zhang et al.'s 2010 article, "Compensating for visco-acoustic effects in reverse-time migration," $80^{th}$ SEG Annual International Meeting, Expanded Abstracts, pages 3,160-3, 164, the content of which is incorporated herein in its entirety). However, extending Zhang's approach to formulate visco-acoustic TTI RTM is difficult, if at all possible.

Alternatively, a visco-elastic mechanical model consisting of standard linear solids (SLSs) has been proposed to model real earth materials and employed to solve the visco-elastic wave equation for forward modeling (see, e.g., Robertsson et al.'s 1994 article, "Viscoelastic finite-difference modeling," in *Geophysics* 59, pages 1,444-1,456, the content of which is incorporated herein in its entirety). In this approach, one SLS consists of a spring in parallel with a spring and a dashpot in series, and can approximate a constant Q within a defined frequency band with a series of SLSs connected in parallel (as described in Day et al.'s 1984 article, "Numerical simulation of attenuated wavefields using Pade approximation method," in the *Geophysical Journal of Royal Astronomy Society* 78, pages 105-118, the content of which is incorporated herein in its entirety). In an SLS, the stress-strain relationship is expressed as a causal time convolution of a stress relaxation function with the strain rate. This time dependence of the relaxation mechanism is governed by stress and strain relaxation times. A visco-elastic rheology with multiple relaxation mechanisms can explain experimental observations of wave propagations in the earth. Carcione et al. (1988) designed a system of equations of motion and introduced memory variables to obviate storing the entire strain history required by the time convolution. This visco-acoustic wave propagation based on multiple relaxation mechanisms can be extended to account for anisotropy; however, the time reversal propagation is unstable, which poses challenges in implementing visco-acoustic TTI RTM.

It is desirable to develop RTM methods that compensate for the absorption effects in TTI medium to obtain enhanced images of structures under complex geological regions with strong velocity contrast and substantial attenuation.

SUMMARY

According to various embodiments, visco-acoustic wave propagation in a TTI medium compensates for the anelastic effects to correct the frequency-dependent energy attenuation and phase distortion caused in the overburden.

According to an embodiment, there is a method for obtaining an image of an explored underground formation. The method includes obtaining survey data carrying structural information of the explored formation, generating initial velocity and absorption models of the explored formation based on the survey data, and updating the initial velocity and absorption models while also determining Thomsen anisotropy parameters depending on tilt angle and azimuth angle of a tilted transverse isotropy, TTI, symmetry axis, using a visco-acoustic reverse time migration, RTM.

According to another embodiment, there is a survey data processing apparatus configured to obtain an image of an explored underground formation. The apparatus includes a communication interface and a data processing unit. The communication interface is configured to obtain survey data carrying structural information of the explored formation. The data processing unit is configured to generate initial velocity and absorption models of the explored formation based on the survey data, and to update the initial velocity and absorption models while also determining Thomsen anisotropy parameters depending on tilt angle and azimuth angle of a tilted transverse isotropy, TTI, symmetry axis, using a visco-acoustic reverse time migration, RTM.

According to yet another embodiment, there is a non-transitory computer readable recording medium storing executable codes which, when executed on a computer having access to survey data, make the computer to perform a method for obtaining an image of an explored underground formation. The method includes obtaining survey data carrying structural information of the explored formation, generating initial velocity and absorption models of the explored formation based on the survey data, and updating the initial velocity and absorption models while also determining Thomsen anisotropy parameters depending on tilt angle and azimuth angle of a tilted transverse isotropy, TTI, symmetry axis, using a visco-acoustic reverse time migration, RTM.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed in the context of processing seismic data. However, similar methods may be employed when other types of waves (e.g., electromagnetic waves) are used to explore an underground formation.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 2:
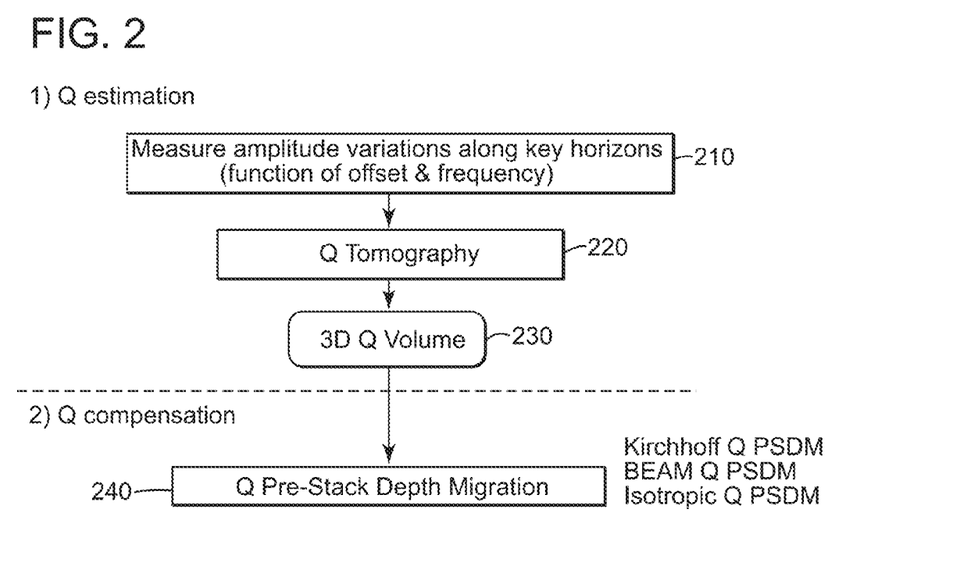
FIG. 2 illustrates Q estimation and compensation phases.

FIG. 2 is a graphical illustration of a seismic data processing method addressing the attenuation issue. A Q estimation is performed in a first phase (above the dashed line). Starting from measured amplitude variations along key horizons (which depend on offset and frequency) at 210, Q tomography (i.e., evaluating Q along a trajectory from the source to a receiver) is performed at 220. For example, the methods described in the previously mentioned 2009 and 2014 Xin articles may be used. At 230, output of Q tomography is assembled to generate a three-dimensional (3D) volume mapping of Q. Conventionally, Q compensation is achieved in a second phase by applying a Q Pre-Stack Depth Migration (PSDM) with absorption compensation, for example, the Kirchoff Q PSDM, the beam Q PSDM or the isotropic Q RTM. Various embodiments described in this document correct frequency-dependent energy attenuation and phase distortion using a Q TTI RTM method in this second phase.

Figure 3:
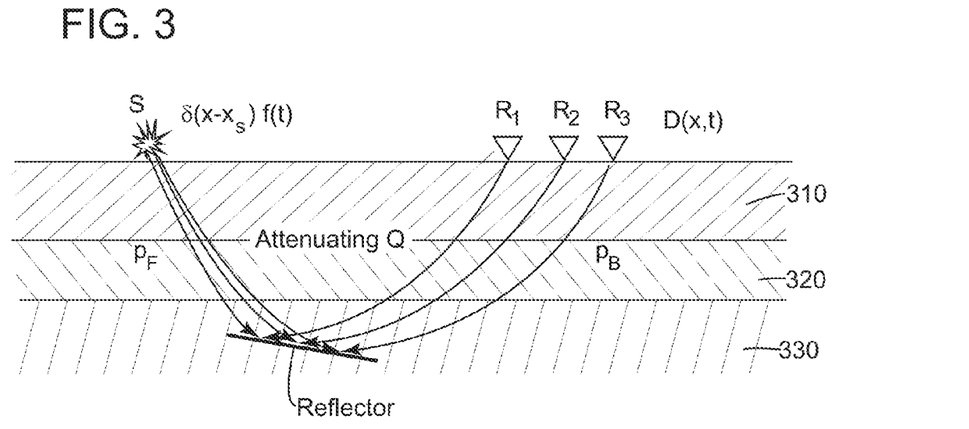
FIG. 3 is an illustration of RTM.

RTM uses a two-way wave equation to correlate the source data representative for the emitted wave and the receiver-recorded data representative for reflections of the emitted wave inside the explored underground formation. FIG. 3 illustrates source data $\delta(x-x_s)f(t)$ forward propagated $\vec{p}_F$ correlated with reverse propagated $\vec{p}_B$ receiver data $D(x,t)$ through layers 310, 320 and 330. Source data characterizes the seismic/acoustic waves generated by source S at position $x_s$, and receiver data $D(x,t)$ is amplitude versus time recorded by receivers $R_1$, $R_2$ and $R_3$. The imaging condition is that reflection coefficient R is:

$$R(\vec{x}) = \int \hat{p}_B(\vec{x},t)\hat{p}_F(\vec{x},t)dt. \quad (1)$$

The visco-acoustic wave equation in a TTI anisotropic medium is derived from the relationship between stress and strain in the case of linear visco-elasticity as follows:

$$(i\omega)^{2-2\gamma}\begin{pmatrix} p \\ r \end{pmatrix} = \quad (2)$$

$$\frac{v_0^2 \cos^2\frac{\pi\gamma}{2}}{\omega_0^{2\gamma}} \begin{pmatrix} 1+2\varepsilon & \sqrt{1+2\delta} \\ \sqrt{1+2\delta} & 1 \end{pmatrix} \begin{pmatrix} G_{xx}+G_{xy} & 0 \\ 0 & G_{zz} \end{pmatrix} \begin{pmatrix} p \\ r \end{pmatrix}$$

where $p(\vec{x},t)$ is the wavefield at the imaging point in the subsurface $\vec{x}$, $\varepsilon$ and $\delta$ are the Thomsen anisotropy parameters, $\gamma(\vec{x})=1/(\pi Q)$ is the absorption coefficient, $\omega_0$ is the reference frequency, $G_{xx}$, $G_{yy}$ and $G_{zz}$ are rotated differential operators, $v_0(\vec{x})$ is the velocity field at the reference frequency, and $r(\vec{x},t)$ is the auxiliary wavefield.

The rotated differential operators are calculated as: $G_{xx}=(D_x)^T(D_x)$ with $$D_x = \frac{\partial}{\partial x}\cos\varphi\cos\theta + \frac{\partial}{\partial y}\sin\varphi\cos\theta - \frac{\partial}{\partial z}\sin\theta,$$

and $(D_x)^T$ the transposed of $(D_y)$, $G_{yy}=(D_y)^T(D_y)$ with $$D_y = \frac{\partial}{\partial x}\sin\varphi - \frac{\partial}{\partial y}\cos\varphi,$$

and $(D_y)^T$ the transposed of $(D_y)$, and $G_{zz}=(D_z)^T(D_z)$ with $$D_z = \frac{\partial}{\partial x}\cos\varphi\sin\theta + \frac{\partial}{\partial y}\sin\varphi\sin\theta + \frac{\partial}{\partial z}\cos\theta$$

and $(D_z)^T$ the transposed of $(D_z)$.

The fractional derivative is approximated by the $L^{th}$ order generalized Maxwell bodies, $$(i\omega)^{-2\gamma} \approx 1 + \sum_{l=1}^{L} \frac{c_l}{i\omega + \omega_l} \quad (3)$$

where $\omega_l$ are the relaxation frequencies and $c_l$ are the weight factors of the classical Maxwell bodies, which form the generalized Maxwell body. A good approximation is achieved through optimized rational expansion up to the $3^{rd}$ order (L=3) generalized Maxwell bodies, while keeping memory usage minimum. Thus, the visco-acoustic TTI wave equations can be reformulated in the time domain as:

$$\begin{cases} \frac{\partial^2}{\partial t^2}\begin{pmatrix} p \\ r \end{pmatrix} + \sum_{l=1}^{L} \frac{\partial^2}{\partial t^2}\begin{pmatrix} d_l \\ e_l \end{pmatrix} = \frac{v_0^2\cos^2\frac{\pi\gamma}{2}}{\omega_0^{2\gamma}}\begin{pmatrix} 1+2\varepsilon & \sqrt{1+2\delta} \\ \sqrt{1+2\delta} & 1 \end{pmatrix} \\ \begin{pmatrix} G_{xx}+G_{xy} & 0 \\ 0 & G_{zz} \end{pmatrix}\begin{pmatrix} p \\ r \end{pmatrix} \\ \omega_l\begin{pmatrix} d_l \\ e_l \end{pmatrix} + \frac{\partial}{\partial t}\begin{pmatrix} d_l \\ e_l \end{pmatrix} = c_l\begin{pmatrix} p \\ r \end{pmatrix} \end{cases} \quad (4)$$

where $$d_l = \frac{c_l}{i\omega + \omega_l}p$$

and $e_l = \frac{c_l}{i\omega + \omega_l}r$ are the memory variables.

Time marching using equation (4) forward propagates the wavefield in an anisotropic visco-acoustic medium. The wavefield is subject to frequency-dependent attenuation through the propagation. Visco-acoustic RTM requires a time-reversed propagation of the receiver wavefield. Unfortunately, the time reversal propagation using equation (4) is unstable. To overcome the instability issue, the anisotropic wave equation in a so-called conjugate medium is used:

$$(i\omega)^2(\omega)^{-2\gamma}(\cos\pi\gamma + i\sin\pi\gamma)\begin{pmatrix} u \\ w \end{pmatrix} = \quad (5)$$

$$\frac{v_0^2\cos^2\frac{\pi\gamma}{2}}{\omega_0^{2\gamma}}\begin{pmatrix} 1+2\varepsilon & \sqrt{1+2\delta} \\ \sqrt{1+2\delta} & 1 \end{pmatrix}\begin{pmatrix} G_{xx}+G_{yy} & 0 \\ 0 & G_{zz} \end{pmatrix}\begin{pmatrix} u \\ w \end{pmatrix}$$

where $u(\vec{x},t)$, $w(\vec{x},t)$ are the wavefield and the auxiliary wavefield, respectively.

The conjugate medium has the same phase velocity as the original visco-acoustic medium, but the time reversal propagation of equation (5) attenuates (instead of boosts) the wavefield in its propagation from the receivers back to the subsurface imaging points. The desired backward propagated receiver wavefield $\tilde{p}(\vec{x},\omega)$ is calculated at each subsurface imaging point $\vec{x}$ by the following amplitude spectrum compensation:

$$\tilde{p}(\vec{x},\omega) = \left|\frac{\tilde{p}_a(\vec{x},\omega)}{\tilde{w}(\vec{x},\omega)}\right|^2 \tilde{w}(\vec{x},\omega) \quad (6)$$

where $\tilde{w}(\vec{x},\omega)$ is the wavefield obtained by solving equation (5), and $\tilde{p}_a(\vec{x},\omega)$ is the wavefield obtained by solving the acoustic TTI wave equation in a lossless medium. The acoustic TTI wave equation in a lossless medium is:

$$(i\omega)^2\begin{pmatrix} p_a \\ r_a \end{pmatrix} = \quad (7)$$

$$\frac{v_0^2\cos^2\frac{\pi\gamma}{2}}{\omega_0^{2\gamma}}\begin{pmatrix} 1+2\varepsilon & \sqrt{1+2\delta} \\ \sqrt{1+2\delta} & 1 \end{pmatrix}\begin{pmatrix} G_{xx}+G_{yy} & 0 \\ 0 & G_{zz} \end{pmatrix}\begin{pmatrix} p_a \\ r_a \end{pmatrix}$$

where $r_a(\vec{x},t)$ is the corresponding auxiliary wavefield in the acoustic TTI wave equation.

The conjugate propagation corresponding to the TTI visco-acoustic propagation in equations (4) is:

$$\begin{cases} \frac{\partial^2}{\partial t^2}\begin{pmatrix} p \\ r \end{pmatrix} + \sum_{l=1}^{L}\frac{\partial^2}{\partial t^2}\begin{pmatrix} d_l \\ e_l \end{pmatrix} = \frac{v_0^2\cos^2\frac{\pi\gamma}{2}}{\omega_0^{2\gamma}}\begin{pmatrix} 1+2\varepsilon & \sqrt{1+2\delta} \\ \sqrt{1+2\delta} & 1 \end{pmatrix} \\ \quad \begin{pmatrix} G_{xx}+G_{yy} & 0 \\ 0 & G_{zz} \end{pmatrix}\begin{pmatrix} p \\ r \end{pmatrix} \\ \omega_l\begin{pmatrix} d_l \\ e_l \end{pmatrix} - \frac{\partial}{\partial t}\begin{pmatrix} d_l \\ e_l \end{pmatrix} = -c_l\begin{pmatrix} p \\ r \end{pmatrix} \end{cases} \quad (8)$$

Returning now to equation (1), operators $\hat{p}_B(\vec{x},t)$ and $\hat{p}_F(\vec{x},t)$ are calculated as:

$$\hat{p}_F = \left|\frac{p_{Fa}(\vec{x},\omega)}{p_F(\vec{x},\omega)}\right|^2 p_F(\vec{x},\omega)$$

$$\hat{p}_B = \left|\frac{p_{Ba}(\vec{x},\omega)}{p_B(\vec{x},\omega)}\right|^2 p_B(\vec{x},\omega)$$

where a indicates solution of acoustic lossless propagation equation for source and receiver, respectively.

Figure 4:
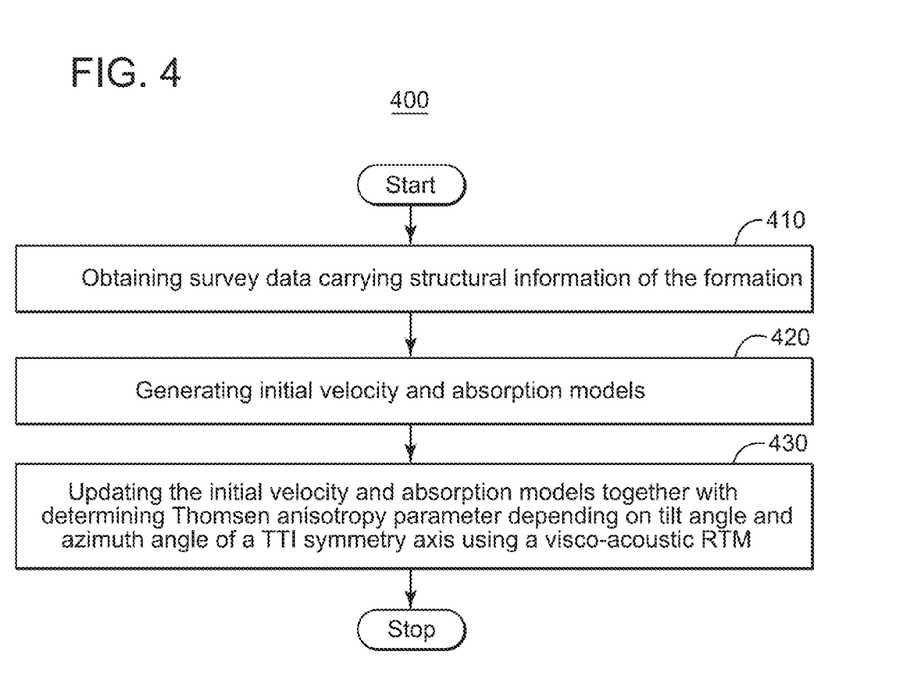
FIG. 4 is a flowchart of a Q TTI RTM method according to an embodiment.

FIG. 4 is a flowchart of a Q TTI RTM method 400 for obtaining an image of an explored subsurface formation according to an embodiment. Method 400 includes obtaining survey data carrying structural information of the explored underground formation at 410. Method 400 further includes generating initial velocity and absorption models at 420. Initial velocity and absorption models may be generated using a Q tomography method. For example, the initial velocity and absorption models may be generated using a Q tomography method in the previously mentioned 2009 and 2014 Xin articles.

Method 400 then includes, at 430, updating the inverted velocity and absorption models together with determining Thomsen anisotropy parameters depending on tilt angle and azimuth angle of a tilted transverse isotropy, TTI, symmetry axis using a visco-acoustic reverse time migration, RTM. The model update may use Q TTI RTM, Kirchoff Q TTI RTM or Beam Q TTI RTM.

The seismic data processing results obtained with the above-described Q TTI RTM are compared with conventional approaches for both synthetic and field data examples.

Figure 5:
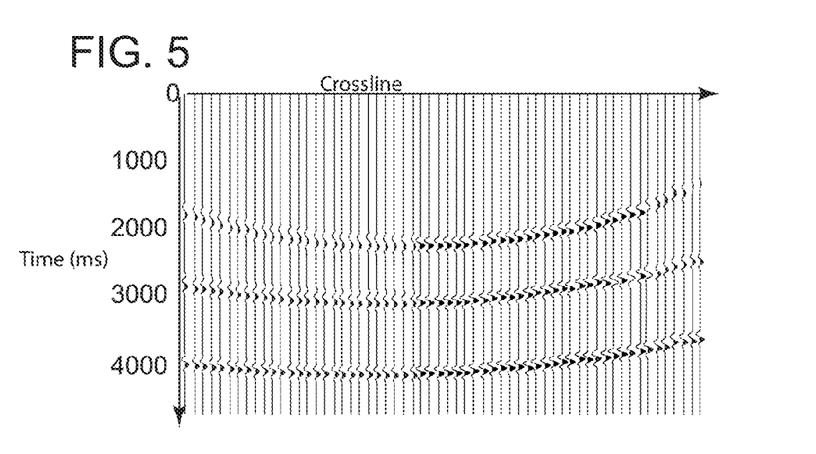
FIGS. 5-7 illustrate test data as simulated, conventionally processed and processed using a Q TTI RTM method, respectively.
Figure 6:
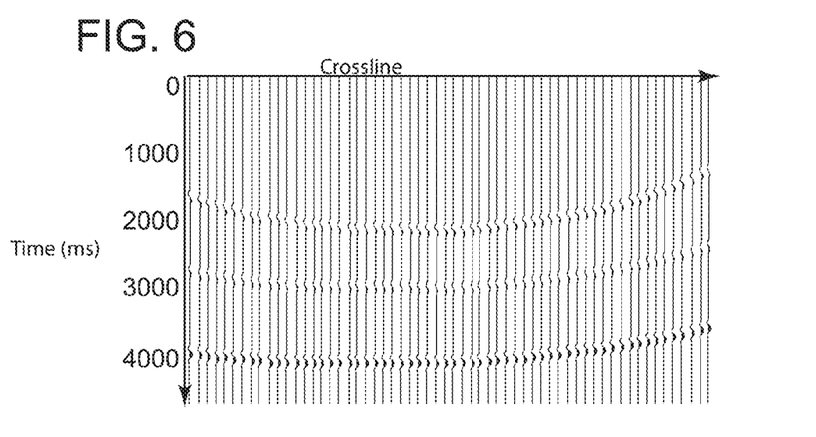

An impulse response test is illustrated in FIGS. 5-8, which show a range of lines with shot and receiver co-located at a central subline and central crossline in the represented range, with a 7 Hz Ricker wavelet as seismic source wavelet and 3 reflectors placed at time 1 s, 2 s and 3 s, respectively. The vertical axis of FIGS. 4-6 is time in ms. The medium has a constant velocity of 2,000 m/s. FIG. 5 shows the impulse response obtained using conventional TTI RTM applied to input data without attenuation (i.e., a reference for the results to be achieved if, on attenuated input, the attenuation is correctly taken into account).

Figure 7:
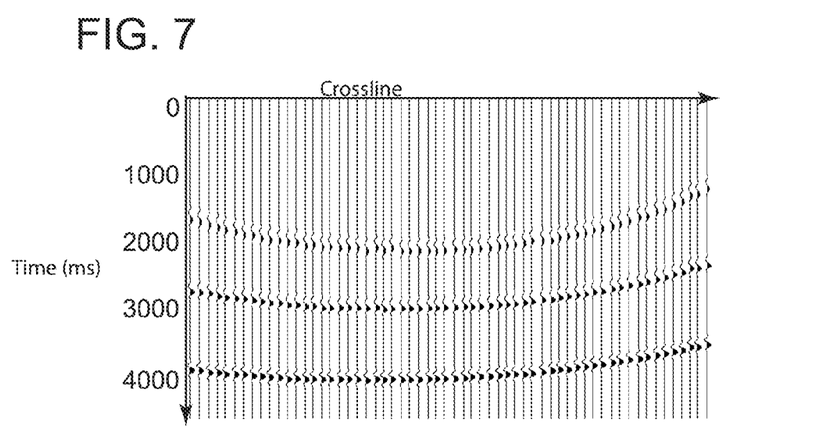

Then a frequency-dependent absorption is applied to the single trace seismic input, with a constant Q=100, and a reference frequency 100 Hz. FIG. 6 shows the impulse response of the input data with absorption, migrated using conventional TTI reverse time migration. The amplitudes are attenuated and the phase is distorted as the velocity varies with frequency. The input data with absorption is then migrated using a visco-acoustic TTI reverse time migration (i.e., Q TTI RTM) according to an embodiment. FIG. 7 shows the Q TTI RTM impulse response, which substantially matches the result in FIG. 5, indicating that the Q TTI RTM successfully compensates for absorption effects.

Figure 8:
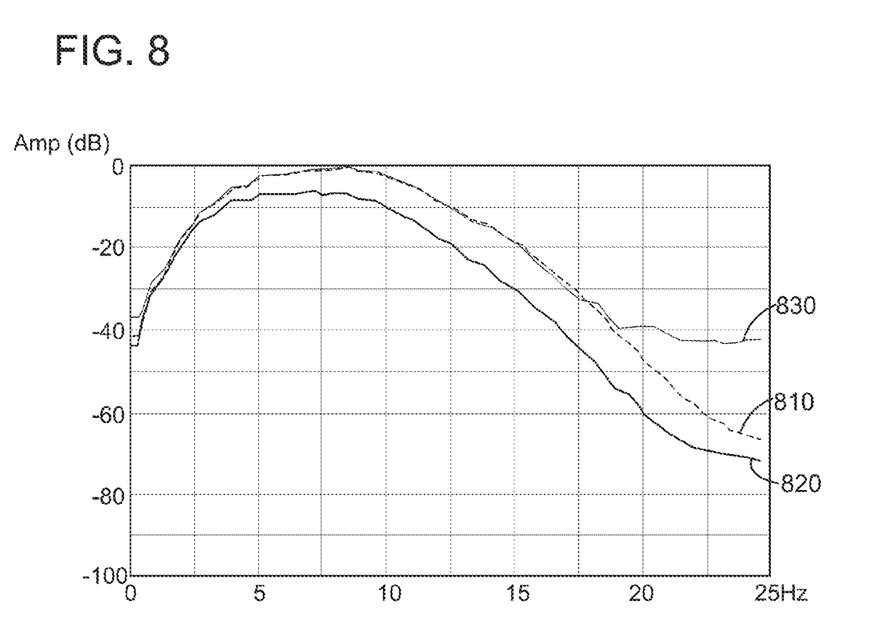
FIG. 8 illustrates spectra of data in FIGS. 5-7.

FIG. 8 compares the spectra (amplitude versus frequency) corresponding to FIGS. 5-7. Line 810 corresponds to FIG. 5, line 820 to FIG. 6 and line 830 to FIG. 7. The spectra comparison indicates that Q TTI RTM efficiently compensates for attenuation in a frequency-dependent manner, thereby matching the spectra corresponding to the image migrated from the input data without attenuation (the reference).

Figure 9:
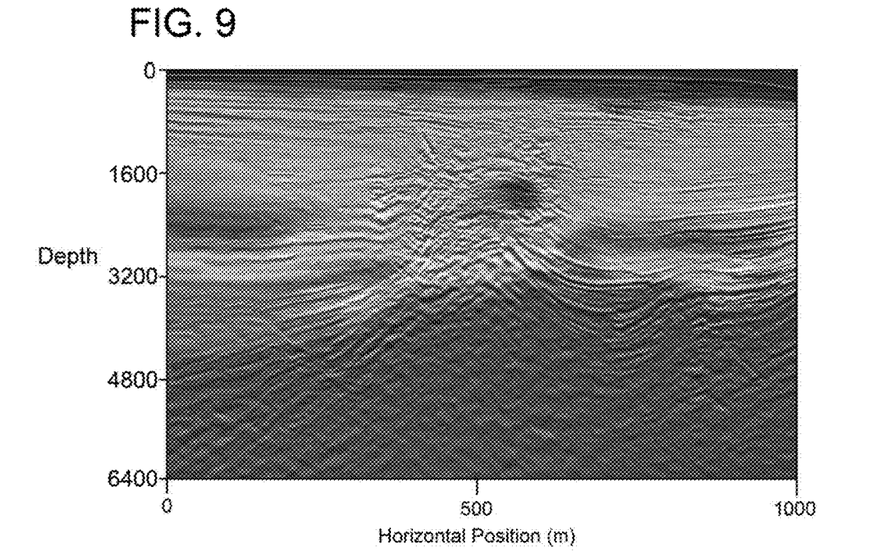
FIG. 9 represents a velocity model corresponding to real survey data.
Figure 10:
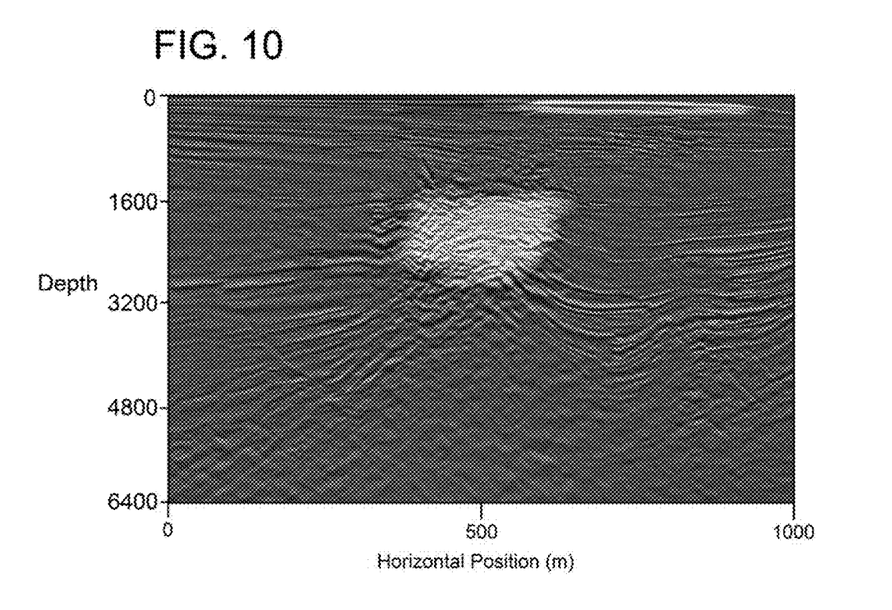
FIG. 10 represents a Q model corresponding to real survey data.

The Q TTI RTM method according to an embodiment has also been applied to a field dataset from offshore Southeast Asia, in a situation in which complex gas pockets in the overburden challenge the imaging of deeper targets. FIGS. 9 and 10 show the velocity model and the absorption anomalies estimated using Q tomographic inversion. FIGS. 9 and 10 represent vertical slices with a horizontal range corresponding to about 1,000 m. The different nuances of gray correspond to different velocities in a range between 1,500 and 2,700 m/s and Q values in a range between 0 and 0.1, respectively.

Figure 11:
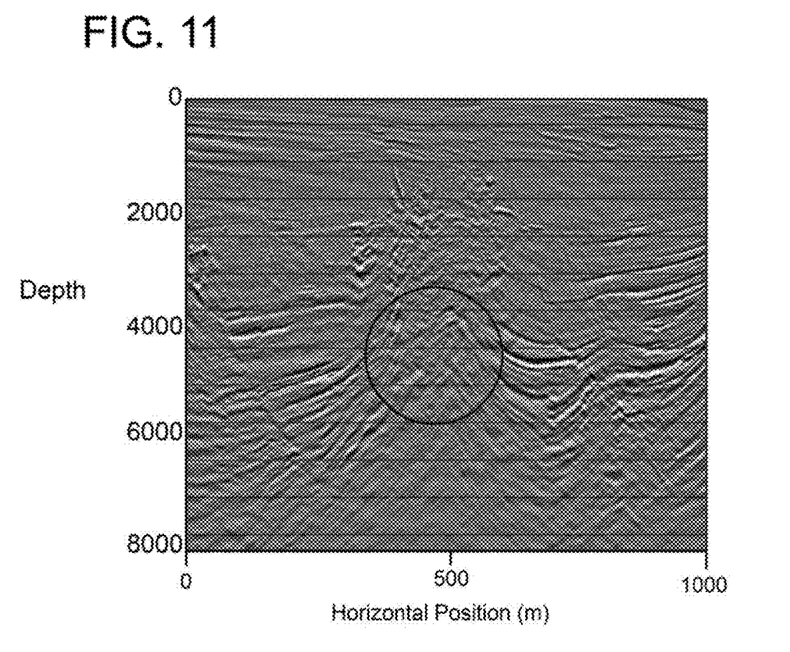
FIGS. 11 and 12 illustrate results obtained for the same data slice using conventional Kirchhoff TTI PSDM and conventional TTI RTM, respectively.
Figure 12:
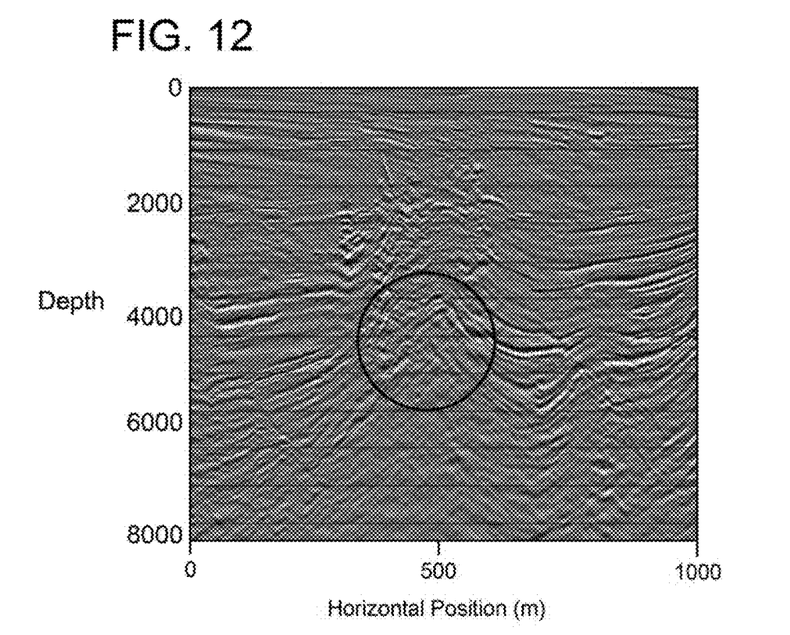

FIGS. 11 and 12 compare results obtained for the same slice (the nuances of gray correspond to amplitude) using conventional Kirchhoff TTI PSDM and conventional TTI RTM, respectively. The circles in the middle emphasize a region where different approaches have biggest impact. RTM handles multi-pathing due to the strong velocity contrast of gas clouds with surrounding sediments, giving a better image than Kirchhoff PSDM. However, amplitude dimming caused by gas in the shallow region was observed in both the Kirchhoff PSDM and RTM sections. The amplitude loss makes it difficult to identify and interpret reflectors.

Figure 13:
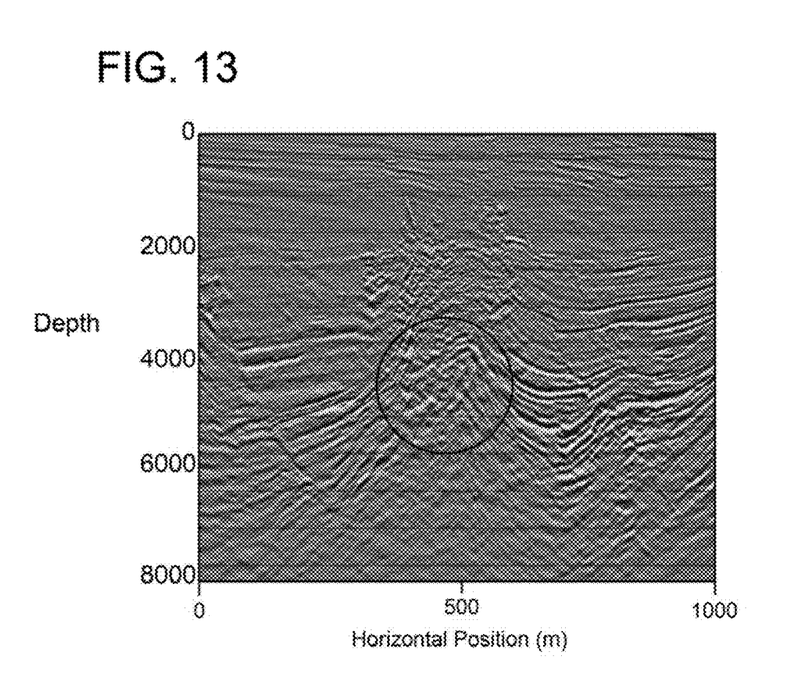
FIGS. 13 and 14 illustrate results obtained for the same data slice using 3D Q Kirchhoff PSDM and Q TTI RTM, respectively.
Figure 14:
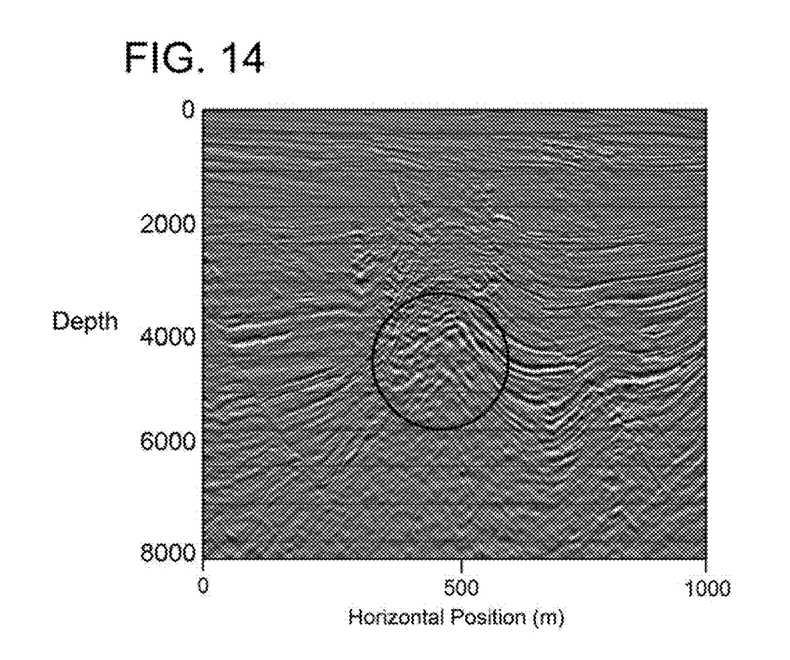

Estimated absorption anomalies have then been used in both 3D Q Kirchhoff PSDM and Q TTI RTM to mitigate dissipation effects, as illustrated in FIGS. 13 and 14. The amplitudes are more balanced after the correction, and the resolution is also increased. The amplitudes of events underneath the shallow gas are visibly restored, wavelets are sharper, and the continuity is improved. Comparing Kirchhoff Q PSDM and Q TTI RTM, they both compensate for the amplitude attenuation, phase distortion and resolution reduction due to the absorption of shallow gas. However, the events underneath the complex shallow gas are clearer, more continuous and stronger in the Q TTI RTM image, attributed to the multi-pathing capability of Q TTI RTM.

Figure 15:
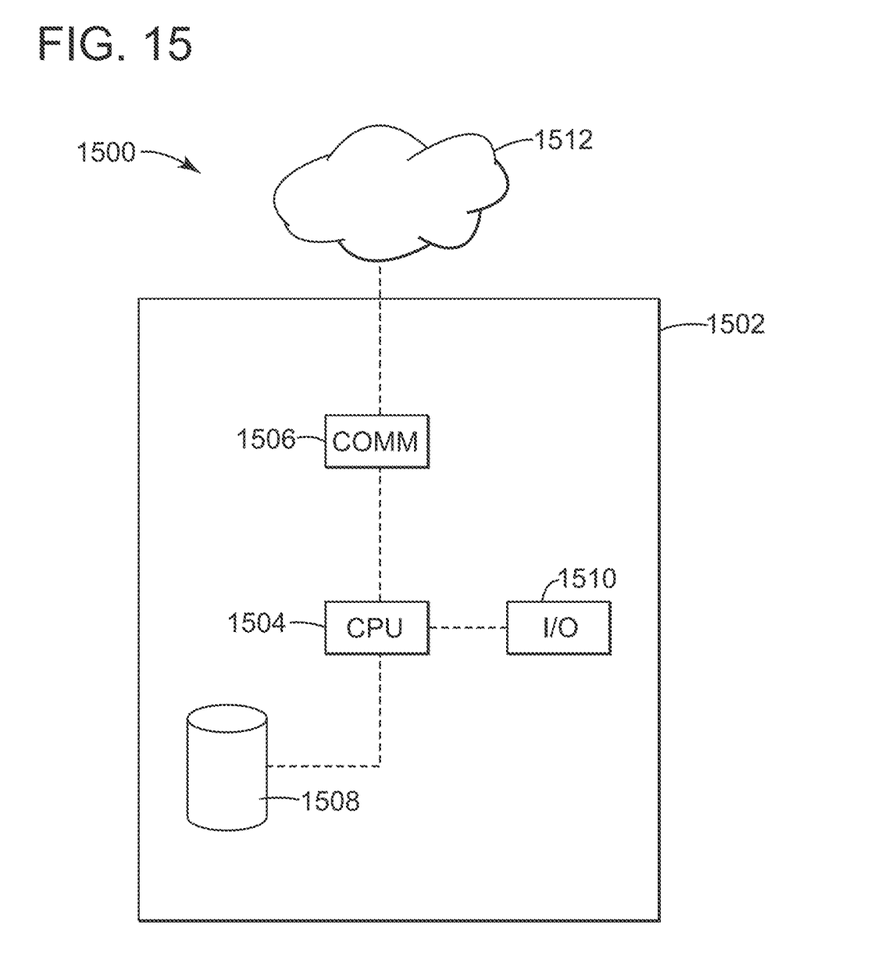
FIG. 15 is a block diagram of a survey data processing apparatus according to an embodiment.

FIG. 15 illustrates a block diagram of a survey data processing apparatus 1500 configured to perform any of the Q TTI RTM methods described in this document, according to an embodiment. Apparatus 1500 includes a computer or server 1502 having one or more central processing units (CPU) 1504 in communication with a communication module 1506, one or more input/output devices (I/O) 1510 and at least one storage device 1508. Hardware, firmware, software or a combination thereof may be used to perform the various steps and operations of the methods described in this section.

Communication module 1506 may be used to obtain the survey data, and may intermediate wired or wireless communication of server 1502 with other computing systems, databases and data acquisition systems across one or more local or wide area networks 1512.

I/O devices 1510 may be used to communicate with a user or to display any images or models of the surveyed underground formation. I/O devices 1510 may include keyboards, point-and-click-type devices, audio devices, optical media devices and visual displays.

CPU 1504, which is in communication with communication module 1506 and storage device 1508, is configured, for example, to generate initial velocity and absorption models, and to update the initial velocity and absorption models together with determining Thomsen anisotropy parameters depending on tilt angle and azimuth angle of a tilted transverse isotropy, TTI, symmetry axis using a visco-acoustic reverse time migration, RTM.

Storage device 1508 may include magnetic media such as a hard disk drive (HDD), solid state memory devices including flash drives, ROM and RAM and optical media. The storage device may store data as well as software code for executing various functions, including the methods described in this section.

The disclosed exemplary embodiments are used to obtain an image of an explored subsurface formation using Q TTI RTM. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for obtaining an image of an explored underground formation, the method comprising:
   obtaining survey data carrying structural information of the explored formation;
   generating initial velocity and absorption models of the explored formation based on the survey data; and
   updating the initial velocity and absorption models while also determining Thomsen anisotropy parameters depending on tilt angle and azimuth angle of a tilted transverse isotropy, TTI, symmetry axis, using a visco-acoustic reverse time migration, RTM,
   wherein the updated velocity and absorption models together with the Thomsen anisotropy parameters are usable for imaging the explored underground formation, the imaging condition being $R(\vec{x}) = \int \hat{p}_B(\vec{x},t) \hat{p}_F(\vec{x},t) dt$ where $R(\vec{x})$ is reflection coefficient at a position $\vec{x}$, $\hat{p}_F(\vec{x},t)$ is forward propagator from a source to the position $\vec{x}$, and $\hat{p}_B(\vec{x},t)$ is backward propagator from a receiver to the position $\vec{x}$, and
   wherein backward propagated receiver wavefield at each subsurface point $\vec{x}$ is calculated as $$\tilde{p}(\vec{x}, \omega) = \left| \frac{\tilde{p}_a(\vec{x}, \omega)}{\tilde{w}(\vec{x}, \omega)} \right|^2 \tilde{w}(\vec{x}, \omega)$$

$\tilde{w}(\vec{x},\omega)$ being a field obtained by solving a visco-acoustic TTI wave equation in a conjugate medium, and $\tilde{p}_a(\vec{x},\omega)$ being a wavefield obtained by solving an acoustic TTI wave equation in a lossless medium.

2. The method of claim 1, wherein a propagation in the conjugate medium has a same phase velocity as in an original visco-acoustic medium, but a time-reversal propagation equation attenuates a backward propagating wavefield.

3. The method of claim 1, wherein the generating of the initial velocity and absorption models includes extracting amplitude variations as function of offset and frequency from the survey data.

4. The method of claim 1, wherein the initial velocity and absorption models are generated using a Q tomography method.

5. The method of claim 1, wherein the survey data is acquired during a marine seismic survey.

6. A survey data processing apparatus is configured to obtain an image of an explored underground formation, the apparatus comprising:
   a communication interface configured to obtain survey data carrying structural information of the explored formation; and
   a data processing unit configured
   to generate initial velocity and absorption models of the explored formation based on the survey data; and
   to update the initial velocity and absorption models while also determining Thomsen anisotropy parameters depending on tilt angle and azimuth angle of a tilted transverse isotropy, TTI, symmetry axis, using a visco-acoustic reverse time migration, RTM,
   wherein the updated velocity and absorption models together with the Thomsen anisotropy parameters are usable for imaging the explored underground formation, the imaging condition being $R(\vec{x})=\int \hat{p}_B(\vec{x},t)\hat{p}_F(\vec{x},t)dt$ where $R(\vec{x})$ is reflection coefficient at a position $\vec{x}$, $\hat{p}_F(\vec{x},t)$ is forward propagator from a source to the position $\vec{x}$, and $\hat{p}_B(\vec{x},t)$ is backward propagator from a receiver to the position $\vec{x}$, and
   wherein the data processing unit calculates a backward propagated receiver wavefield at each subsurface point $\vec{x}$ as $$\tilde{p}(\vec{x},\omega) = \left|\frac{\tilde{p}_a(\vec{x},\omega)}{\tilde{w}(\vec{x},\omega)}\right|^2 \tilde{w}(\vec{x},\omega)$$

$\tilde{w}(\vec{x},\omega)$ being a field obtained by solving a visco-acoustic TTI wave equation in a conjugate medium, and $\tilde{p}_a(\vec{x},\omega)$ being a wavefield obtained by solving an acoustic TTI wave equation in a lossless medium.

7. The apparatus of claim 6 wherein a propagation in the conjugate medium has a same phase velocity as in an original visco-acoustic medium, but a time-reversal propagation equation attenuates a backward propagating wavefield.

8. The apparatus of claim 6, wherein the data processing unit extracts amplitude variations as function of offset and frequency from the survey data to generate the initial velocity and absorption models.

9. The apparatus of claim 6, wherein the data processing unit generates the initial velocity and absorption models using a Q tomography method.

10. The apparatus of claim 6, wherein the survey data is acquired during a marine seismic survey.

11. A non-transitory computer readable recording medium storing executable codes which, when executed on a computer having access to survey data, make the computer to perform a method for obtaining an image of an explored underground formation, the method comprising:
   obtaining the survey data which carries structural information of the explored formation;
   generating initial velocity and absorption models of the explored formation based on the survey data; and
   updating the initial velocity and absorption models together with determining Thomsen anisotropy parameters depending on tilt angle and azimuth angle of a tilted transverse isotropy, TTI, symmetry axis using a visco-acoustic reverse time migration, RTM,
   wherein the updated velocity and absorption models together with the Thomsen anisotropy parameters are usable for imaging the explored underground formation, the imaging condition being $R(\vec{x})=\int \hat{p}_B(\vec{x},t)\hat{p}_F(\vec{x},t)dt$ where $R(\vec{x})$ is reflection coefficient at a position $\vec{x}$, $\hat{p}_F(\vec{x},t)$ is forward propagator from a source to the position $\vec{x}$, and $\hat{p}_B(\vec{x},t)$ is backward propagator from a receiver to the position $\vec{x}$, and
   wherein backward propagated receiver wavefield at each subsurface point $\vec{x}$ is calculated as $$\tilde{p}(\vec{x},\omega) = \left|\frac{\tilde{p}_a(\vec{x},\omega)}{\tilde{w}(\vec{x},\omega)}\right|^2 \tilde{w}(\vec{x},\omega)$$

$\tilde{w}(\vec{x},\omega)$ being a field obtained by solving a visco-acoustic TTI wave equation in a conjugate medium, and $\tilde{p}_a(\vec{x},\omega)$ being a wavefield obtained by solving an acoustic TTI wave equation in a lossless medium.

12. The non-transitory computer readable recording medium of claim 11, wherein a propagation in the conjugate medium has a same phase velocity as in an original visco-acoustic medium, but a time-reversal propagation equation attenuates a backward propagating wavefield.

13. The non-transitory computer readable recording medium of claim 11, wherein the generating of the initial velocity and absorption models includes extracting amplitude variations as function of offset and frequency from the survey data.

14. The non-transitory computer readable recording medium of claim 11, wherein the initial velocity and absorption models are generated using a Q tomography method.

15. The non-transitory computer readable recording medium of claim 11, wherein the survey data is acquired during a marine seismic survey.

* * * * *